United States Patent [19]

Omoto et al.

[11] Patent Number: 5,080,429
[45] Date of Patent: Jan. 14, 1992

[54] SLIDABLE ROOF DEVICE FOR A MOTOR VEHICLE

[75] Inventors: Seiichi Omoto; Kenji Matsumoto; Satoshi Kubota, all of Hiroshima, Japan

[73] Assignee: Mazda Motor Corporation, Hiroshima, Japan

[21] Appl. No.: 498,747

[22] Filed: Mar. 26, 1990

[30] Foreign Application Priority Data

Aug. 11, 1989 [JP] Japan .................. 1-209261

[51] Int. Cl.$^5$ .......................... B60J 7/02; B60J 7/057
[52] U.S. Cl. .................................. 296/219; 296/223
[58] Field of Search .................... 296/219, 220, 223

[56] References Cited

U.S. PATENT DOCUMENTS

| 2,025,874 | 12/1935 | Lange | 296/219 |
|---|---|---|---|
| 2,103,372 | 12/1937 | Lange | 296/219 |
| 2,985,483 | 5/1961 | Bishop et al. | 296/219 X |
| 4,838,607 | 6/1989 | Mizuma et al. | 296/219 |
| 4,940,283 | 7/1990 | Androy | 296/223 X |

FOREIGN PATENT DOCUMENTS

| 0336414 | 10/1989 | European Pat. Off. | 296/219 |
|---|---|---|---|
| 1111964 | 7/1961 | Fed. Rep. of Germany . | |
| 63-40228 | 3/1988 | Japan . | |
| 63-82883 | 4/1988 | Japan . | |
| 63-112217 | 5/1988 | Japan | 296/219 |
| 165013 | 1/1934 | Switzerland | 296/219 |
| 1315364 | 5/1973 | United Kingdom . | |

Primary Examiner—Dennis H. Pedder
Attorney, Agent, or Firm—Wenderoth, Lind & Ponack

[57] ABSTRACT

A slidable roof device for a motor vehicle wherein a roof panel opening of the vehicle body is openably and closeably covered with a flexible member. For opening both front and rear portions of the roof panel opening of the vehicle body, the device includes a first drive mechanism which is operatively interconnected with the front portion of the flexible member for moving the front portion thereof to the rearward direction of the vehicle body, and a second drive mechanism which is operatively interconnected with the rear portion of the flexible member for moving the rear portion thereof to the forward direction of the vehicle body. The first and the second drive mechanisms are provided at the rear end of the roof panel opening of the vehicle body.

15 Claims, 7 Drawing Sheets

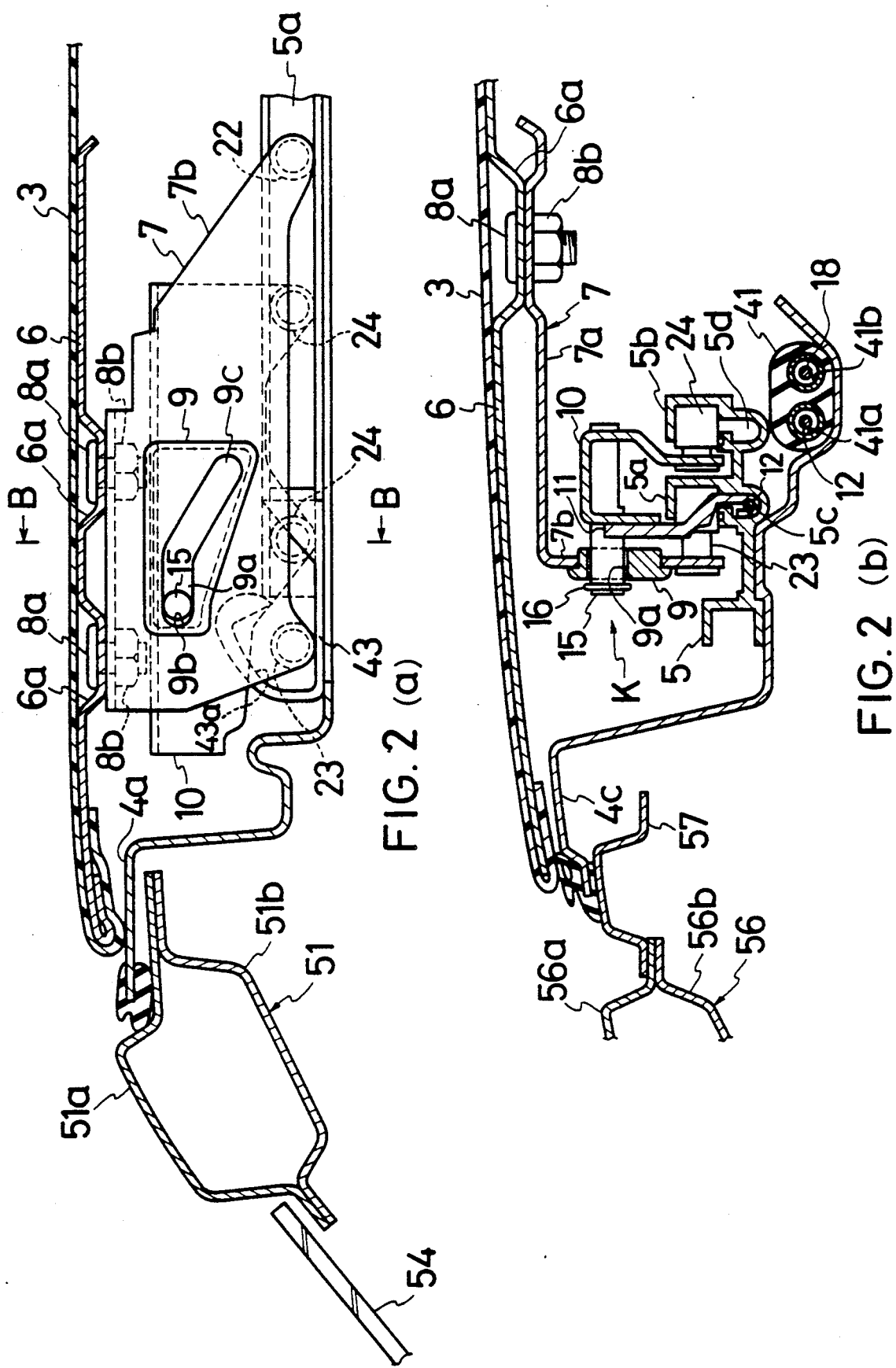

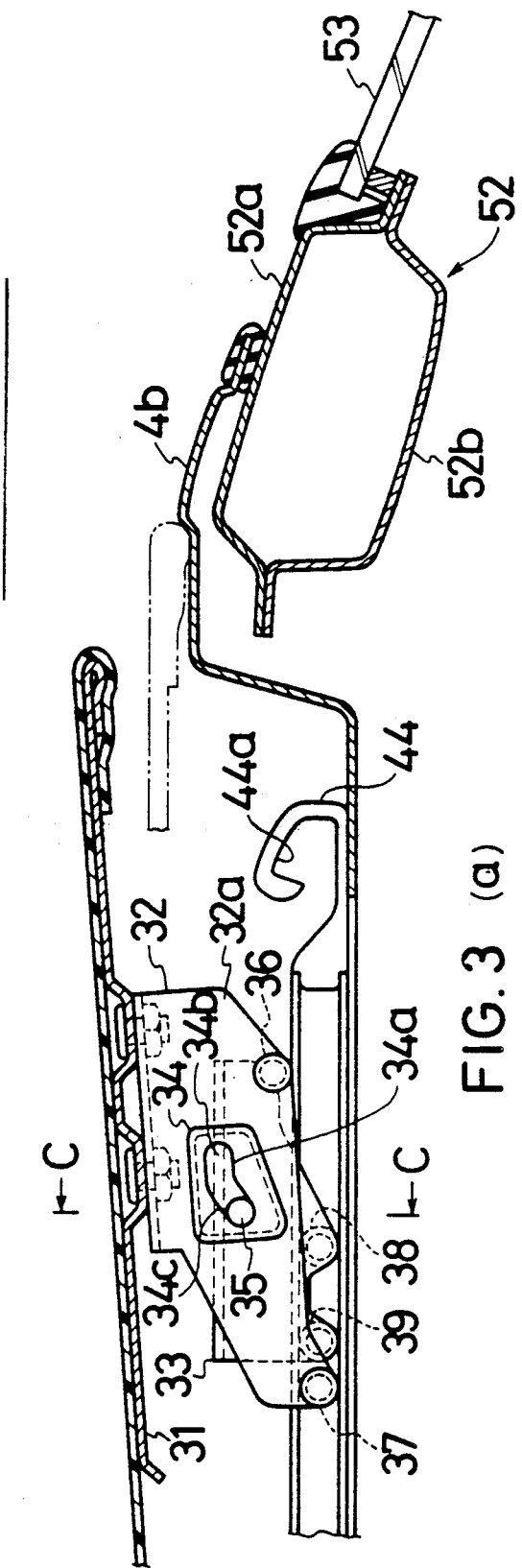
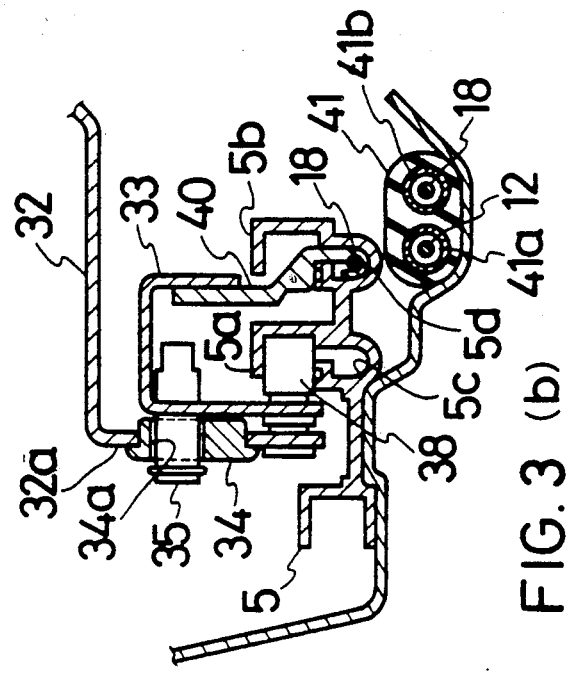
FIG. 3(a)
FIG. 3(b)

SLIDABLE ROOF DEVICE FOR A MOTOR VEHICLE

BACKGROUND OF THE INVENTION

1. Field of the Invention

The present invention relates to a slidable roof device for a motor vehicle such as an automobile.

2. Description of the Prior Art

A slidable roof apparatus equipped with a flexible slidable roof member for covering a roof panel opening of a motor vehicle wherein the flexible member is openable from the forward to the rearward direction of a vehicle body has been known in the art as disclosed in Japanese Utility Model Application Laying Open Gazette No. 63-40228.

However, this type of slidable roof apparatus opens only the front of the roof panel opening of the vehicle body by opening the flexible member. Therefore, when there are passengers in the rear seat, the flexible member is folded into the rear portion of the roof panel opening and overlies the passengers in the rear seat. This means that even if the roof panel fully opening is opened full, the passengers in the rear seat may feel uncomfortable and stifled.

A further disadvantage of this apparatus is that, since only the front of the roof panel opening can be opened, air will not circulate through the vehicle from the opening, thus failing to obtain favorable ventilation. In addition, opening only the front of the roof panel opening may have the result that the vehicle cabin functions as a kind of a resonance box, thereby creating a resonance, or a throb sound.

SUMMARY OF THE INVENTION

The primary object of the present invention is to provide a slidable roof device for a motor vehicle which can offer passengers in the rear seat a comfortable ride as well as improve ventilation inside the vehicle cabin.

A slidable roof device for a motor vehicle according to the present invention includes: a roof panel constituting an upper portion of a vehicle body; a roof panel opening provided in the roof panel of the vehicle body and enclosed with a front header, right and left roof rails and a rear header; and a flexible member mounted on the roof panel and foldable in the longitudinal direction of the vehicle body, the flexible member being selectively movable between a folded state for opening the roof panel opening and an extended state for closing the roof panel opening. To achieve the above-mentioned objects, the device of the present invention includes the above-mentioned elements as well as a: first drive means operatively interconnected with the front portion of the flexible member for moving the front portion thereof toward the rear of the vehicle body, and a second drive means operatively interconnected with the rear portion of the flexible member for moving the rear portion thereof toward the front of the vehicle body. The first and the second drive means are provided in the rear of the roof panel opening of the vehicle body.

In the present invention, the front and rear portions of the roof panel opening of the vehicle body can be opened by the activation of the first drive means and the second drive means, respectively. Accordingly, passengers in the rear seat as well as a driver and a passenger in the front seat can enjoy a comfortable ride. Further, since both the first and second drive means are in the rear of the roof panel opening, a wider opening area in the front portion of the roof panel opening can be obtained.

Another object of the present invention is to provide a slidable roof device for a motor vehicle wherein a frame member forming a roof panel opening is provided in such a manner that the front portion thereof is attached to a front header, the rear portion thereof is attached to a rear header, and the sides thereof are attached respectively to right and left roof rails. Additionally, the first and second drive means are provided substantially at the lateral center of the rear portion of the frame member. In this case, for example, the first and second drive means can be spaced apart in the lateral direction at the lower side of the rear portion of the frame member.

A further object of the present invention is to provide a slidable roof device for a motor vehicle wherein the first and the second drive means are first and second drive motors, respectively operatively interconnected with the front and the rear portions of the flexible member by means of drive wires, and portions of the drive motors are superposed in order to reduce room needed for the arrangement of the drive means. In this case, for example, portions of reduction gear parts provided respectively in the first and second drive motors can be superposed in upper and lower positions (i.e. along a vertical direction). Alternatively, the first and second drive means can be disposed in the upper and lower positions at the rear portion of the frame member so that, not only portions thereof, but the entire drive means are superposed in the upper and lower positions.

The foregoing and other objects and novel features of the present invention will become more apparent upon reading the following detailed description with reference to the drawings.

BRIEF DESCRIPTION OF THE DRAWINGS

The accompanying drawings show preferred embodiments of the present invention. FIGS. 1 through 5 show a first embodiment of the invention, in which:

FIG. 1 is a perspective view of a motor vehicle in accordance with the present invention;

FIG. 2(a) is a sectional view taken along the line A—A of FIG. 1;

FIG. 2(b) is a sectional view taken along the line B—B of FIG. 2(a);

FIG. 3(a) is a similar view to FIG. 2(a) but showing the rear of a roof panel opening of a vehicle body;

FIG. 3(b) is a sectional view taken along the line C—C of FIG. 3(a);

FIG. 4 is a schematic plan view of a frame member; and

FIG. 5 is a partly plan view showing a portion wherein a drive motor is mounted.

FIGS. 6 through 9 show a second embodiment of the invention, in which:

FIG. 6 is a schematic plan view of a frame member;

FIG. 7 is a partly plan view showing a portion wherein a drive motor is mounted;

FIG. 8 is a sectional view taken along the line VIII—VIII of FIG. 7; and

FIG. 9 is a perspective view showing the relationship among the drive motor, a drive wire and a gear.

FIGS. 10 and 11 show a third embodiment of the invention, in which:

FIG. 10 is a schematic plan view showing an alternate form of the invention; and FIG. 11 is a sectional view taken along the line XI—XI of FIG. 10.

DETAILED DESCRIPTION OF THE PREFERRED EMBODIMENT

A preferred embodiment of the present invention will be described in detail in connection with the accompanying drawings.

Figure 1:
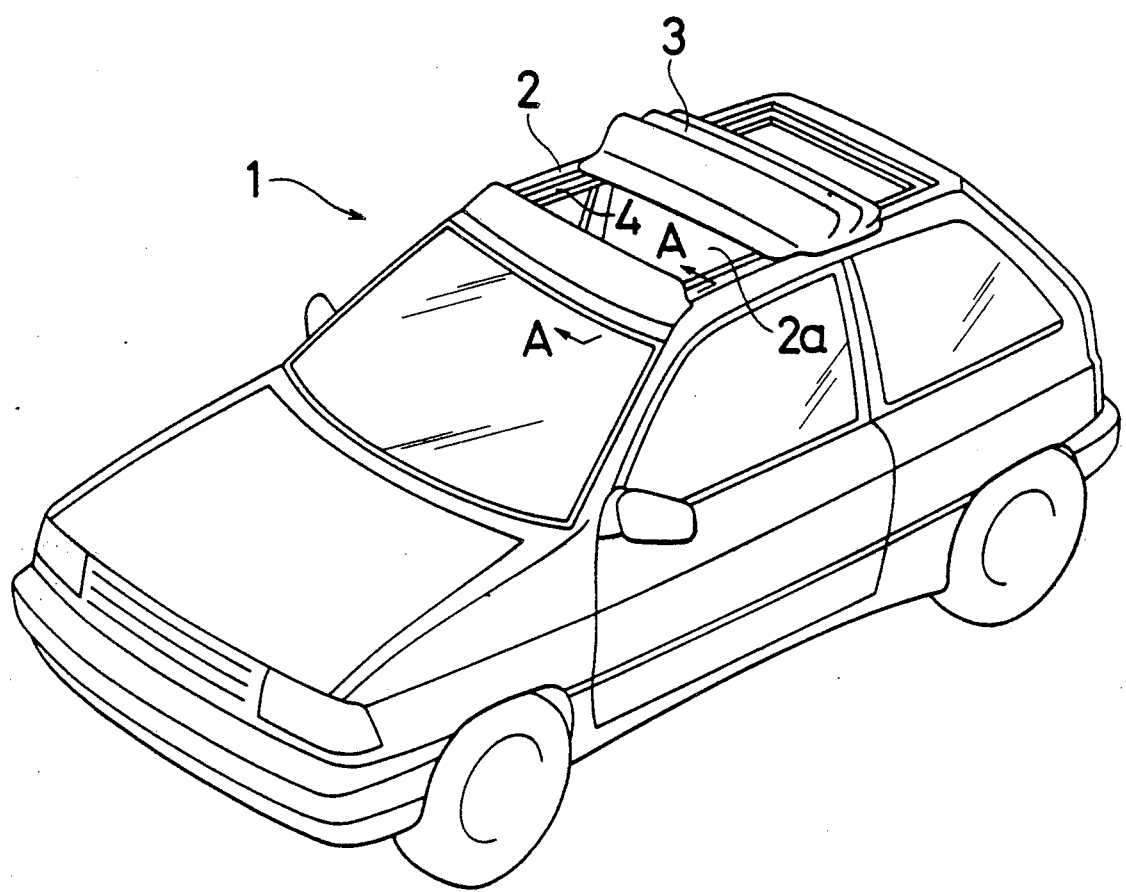

Referring to FIG. 1, reference numeral 1 designates a motor vehicle. A roof panel 2 of the motor vehicle 1 has an opening 2a. This roof panel opening 2a is openably and closably covered with a flexible member 3 (a hood member).

Mounted on the vehicle roof panel 2 is a rectangular-shaped frame member 4. Guide rails 5, 5 (refer to FIGS. 2(a) and (b)) are provided at the both sides of the frame member 4. Foldably mounted along the guide rails 5, 5 is the flexible member 3 so as to be openable (foldable) in the longitudinal direction of the vehicle body in both the forward and rearward directions thereof.

More closely looking at the front portion of the flexible member 3, as shown in FIGS. 2(a) and (b), formed at the right and the left sides of a front plate member 6 are mounting portions 6a, 6a on which a mounting bracket 7 is fixed by means of bolts 8a and nuts 8b. The mounting bracket 7 includes a base 7a extending substantially in parallel with a front plate member 6 to be fixed on the mounting portions 6a, 6a, and a supporting portion 7b extending downwardly from the outer periphery of the base 7a. A cam member 9 having a cam groove 9a is secured in the supporting portion 7b. The cam groove 9a includes a front horizontal groove portion 9b extending substantially in the horizontal direction, and a rear inclined groove portion 9c extending downwardly and rearwardly from the rear end of the horizontal groove portion 9b.

A slider 10 having a substantially inverted U-shaped in cross section is connected with the mounting bracket 7 by means of an engaging pin 15. This engaging pin 15 slidably engages with the cam groove 9a of the cam member 9. The engaging pin member 15 projects sideward from the upper portion of the slider 10. The end portion of the engaging pin member 15 passing through the cam groove 9a of the cam member 9 is provided with a snap ring 16 whereby the mounting bracket 7 and the slider 10 are connected. The engagement between the engaging pin member 15 and the cam groove 9a of the cam member 9 contitutes a tilt means K for tilting up the front portion of the flexible member 3 at the initial phase of the opening operation thereof.

The rear part of the supporting portion 7b of the mounting bracket 7 has, at the lower end thereof, a shoe member 22 which slidably engages with an outside guide groove 5a of the guide rail 5, while the front part of the supporting portion 7b has, at the lower end thereof, another shoe member 23 which slides on the upper surface of the guide rail 5. Thus, with this arrangement, the front portion of the flexible member 3 moves upward when the flexible member 3 retreats i.e. as it is folded.

The slider 10 slidably engages with an inside guide groove 5b of the guide rail 5 by means of shoe members 24, 24. A guide bracket 11 corresponding to the guide rail 5 is fixed to the slider 10. The lower end portion of the guide bracket 11 is connected with a front drive wire 12 which is located in an outside housing groove 5c of the guide rail 5.

Figure 4:
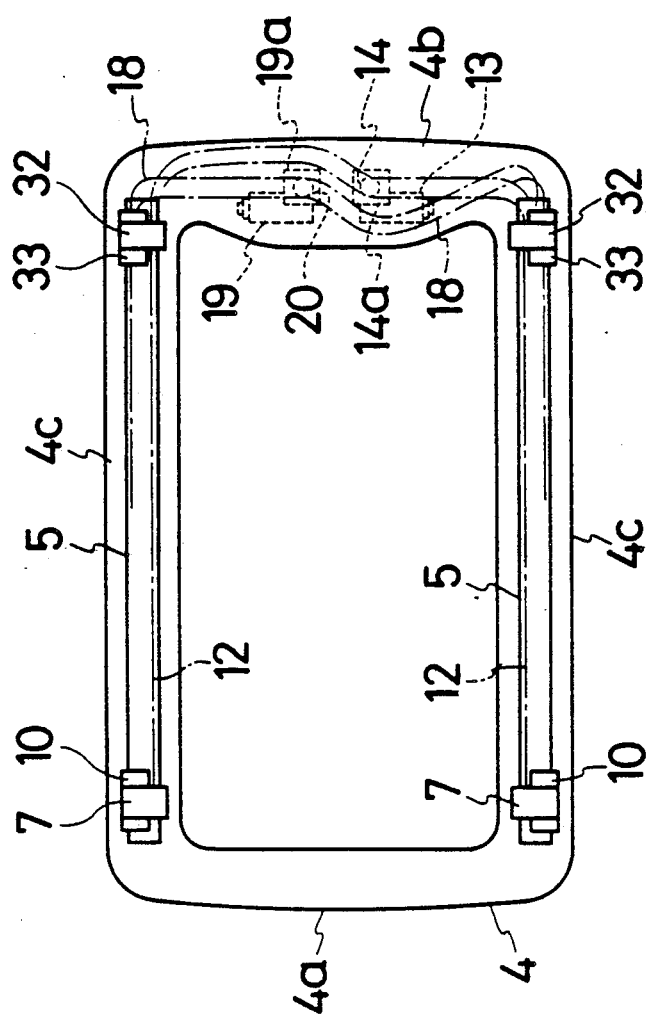
Figure 5:
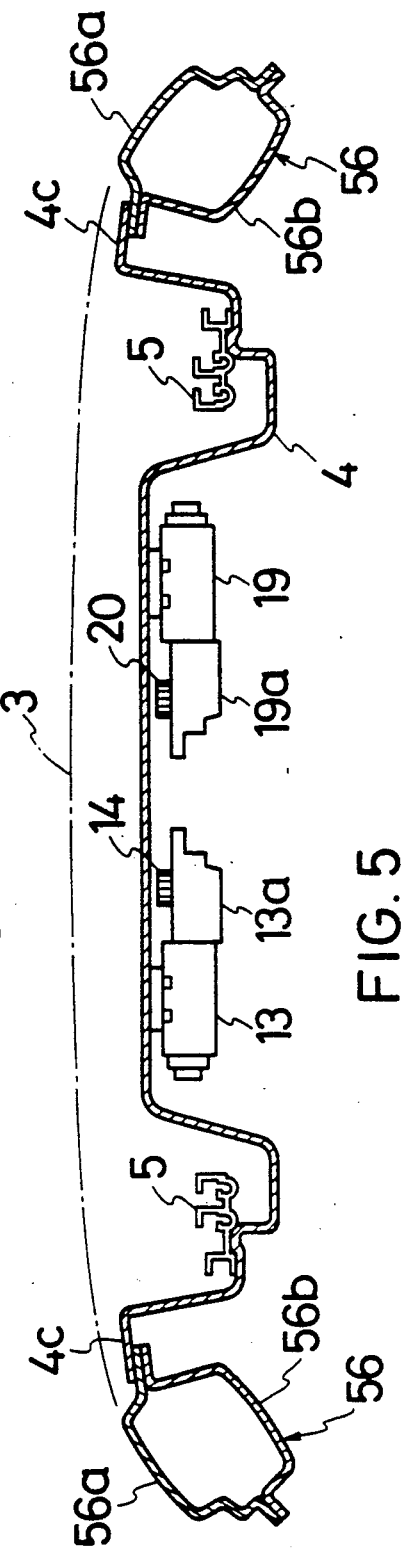
Figure 6:
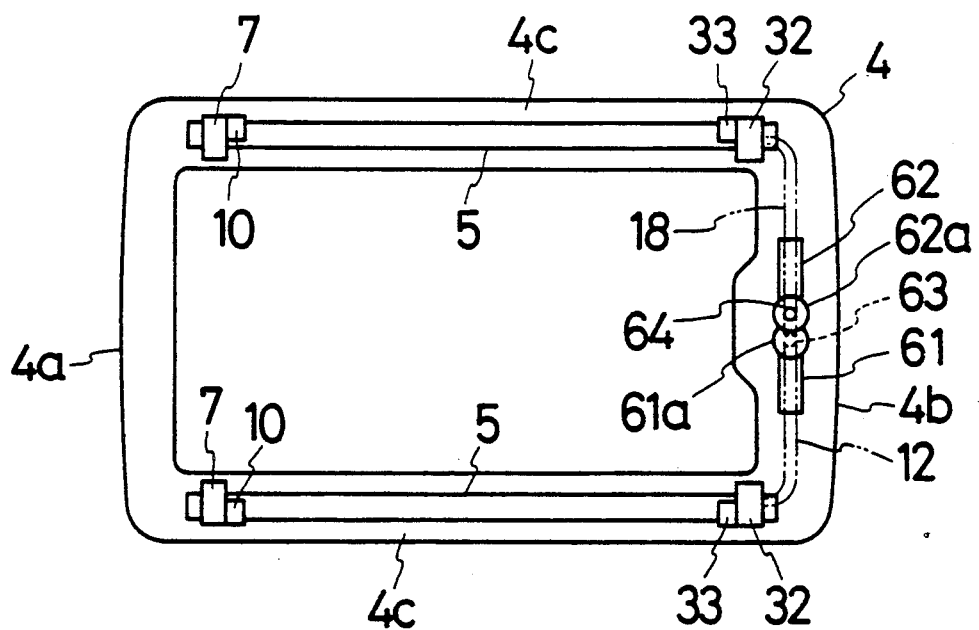
Figure 7:
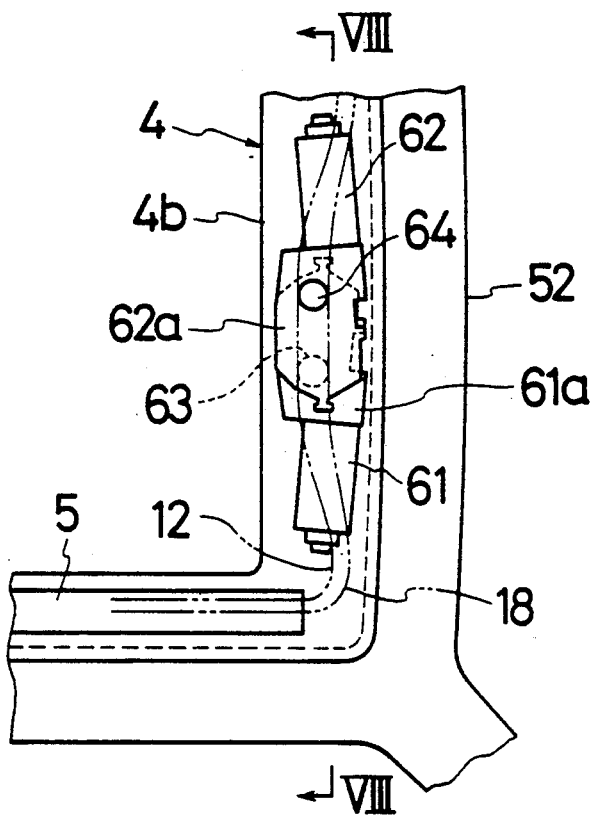
Figure 8:
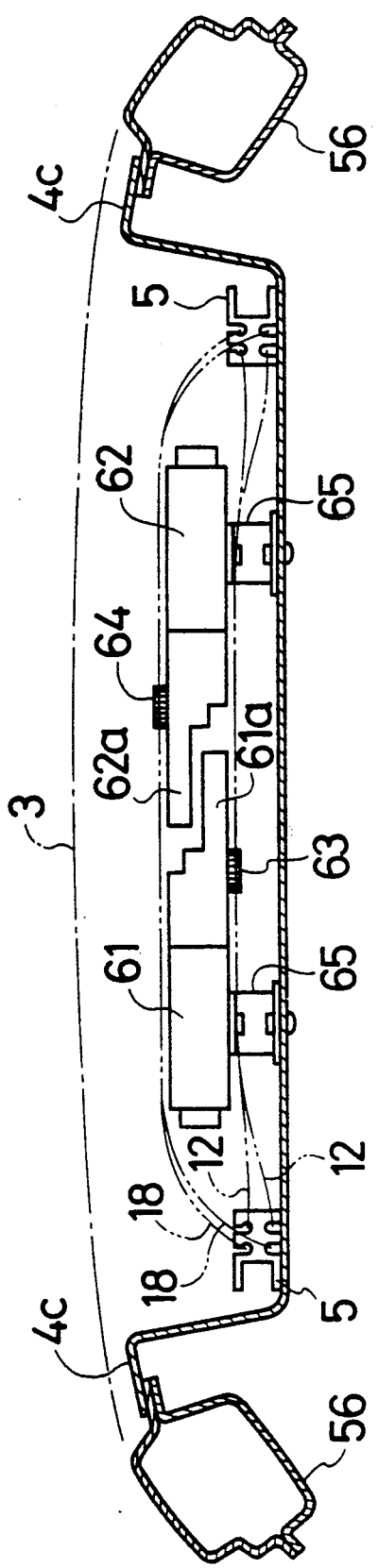
Figure 9:
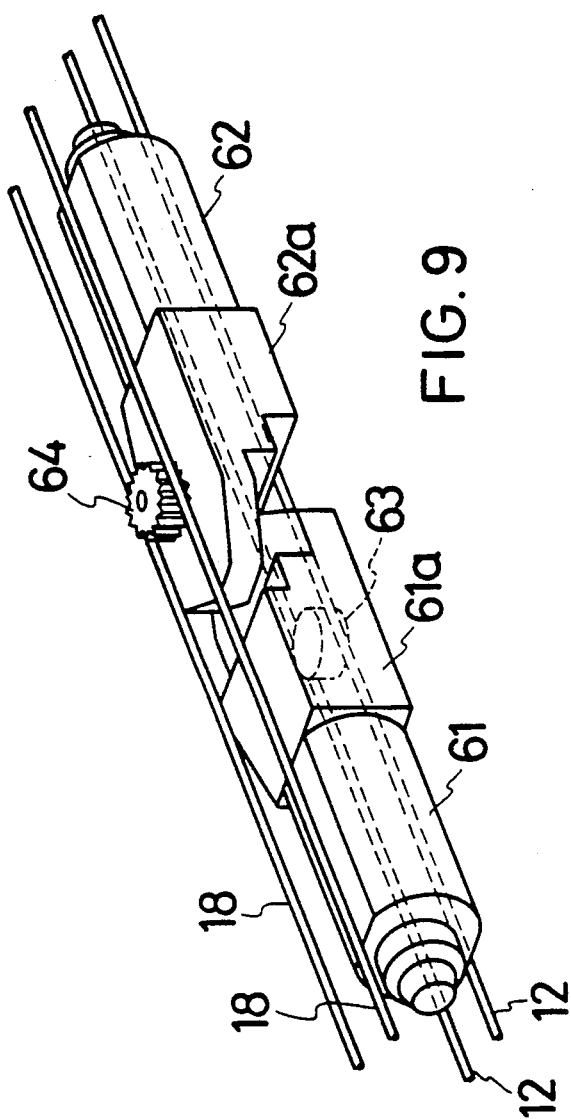

As shown in FIGS. 4 and 5, the drive wire 12 engages with a gear 14 which is rotated through a reduction gear part 13a by a first drive motor 13 located substantially on the left of the center of the rear side of the frame member 4. Then the drive wire 12 extends inside a front idle cable housing portion 41a, an outer idle cable housing of a cable housing member 41 located below the other guide rail 5. With the rotation of the first drive motor 13, the drive wire 12 opens the front portion of the flexible member 3. As a result, the front portion of the roof panel opening 2a is opened.

Accordingly, when opening the front portion of the flexible member 3, first the slider 10 withdraws and this withdrawal changes the relation of the engagement between the engaging pin member 15 and the cam groove 9a of the cam member 9 so as to restrict the position of the mounting bracket 7. Then the front portion of the mounting bracket 7 moves upward against the slider 10. As a result, the front plate member 6, i.e. the front portion of the flexible member 3 tilts up and then withdraws to open.

The rear portion of the flexible member 3 opens in the same manner as the front portion thereof. That means the rear plate member 31, i.e. the rear portion of the flexible member 3, tilts up and then moves forward to open the rear of the roof panel opening 2a. More specifically, as shown in FIGS. 3(a), (b), a mounting bracket 32 is fixed on the rear plate member 31. A slider 33 is connected with a supporting portion 32a of the mounting bracket 32 by means of an engaging pin member 35 which slidably engages with a cam groove 34a of a cam member 34 fixed on the mounting bracket 32. In contrast with the cam groove 9a of the front cam member 9, the cam groove 34a comprises a rear horizontal groove portion 34b extending substantially in the horizontal direction, and an inclined groove portion 34c extending downwardly and forwardly from the front end of the horizontal groove portion 34b. The mounting bracket 32 and the slider 33 are provided with guide shoes 36, 37 and 38, 39.

A rear drive wire 18 is connected, by means of a guide bracket 40, with the slider 33 which tilts up or opens the rear plate member 31. The rear drive wire 18 is disposed in an inside housing groove 5d of the guide rail 5. The rear drive wire 18 engages with a gear 20 which is rotated through a reduction gear part 19a by a second drive motor 19 located just to the right of the center of the rear portion of the frame member 4. Then the rear drive wire 18 extends inside a rear idle cable housing portion 41b, an inner idle cable housing of the cable housing member 41 located below the other guide rail 5. With this arrangement, the rear drive wire 18 is operated by the rotation of the second drive motor 19. The gears 20 and 14 are mounted on the upper surfaces of the reduction gear parts 19a, 13a. The gears 14, 20 are positioned between the frame member 4 and the reduction gear parts 13a, 19a of the drive motors 13, 19.

Both first and second drive motors 13, 19 are located substantially at the center of the rear portion of the frame member 4. In this way, first and the second drive motors 13, 19 are disposed in one place so as not to reduce the opening area of the front of the roof panel opening 2a. Both drive motors 13, 19 are mounted on the lower surface of the frame member 4 (refer to FIG. 5). More specifically, although not shown in the drawings, the drive motors 13, 19 are covered with trim if necessary.

Stopper members 43, 44 are mounted respectively at the front and rear ends of the guide rails 5, 5. The interval in the longitudinal direction between the stopper members 43 and 44 is set longer than the length of the flexible member 3 when the flexible member 3 is in the fully-closed state by its tensile force. Accordingly, either the front portion first closes or the rear portion first closes, the flexible member 3 is always fully extended when closed. The stopper members 43, 44 are provided with upwardly-indented stopper grooves 43a, 44a with which the guide shoes 23, 36 engage. For example, if the front portion of the flexible member 3 (the guide shoe 23) first makes contact with the stopper member 43, the front portion tends to be pulled rearwardly when closing the rear portion. However, this force to rearward direction is a tensile force of the flexible member 3 and it acts on the upper side of the engaging pin member 15. Therefore, the front portion of the flexible member 3 (the front plate member 6) pivotally moves upward, with the engaging pin member 15 acting as a rotational axis. Thus, the guide shoe 23 engages with the stopper groove 43a of the stopper member 43. As a result, the rearward force can be restricted. On the other hand, when opening the front portion of the flexible member 3, force is generated by the drive wire 12. This force acts on the lower side of the engaging pin member 15. Therefore, even when the guide shoe 23 engages with the stopper groove 43a of the stopper member 43, the engagement is released. Thus, the front of the roof panel opening 2a is opened smoothly.

Although not shown in the drawings, a folding mechanism, for example, as disclosed in Japanese Utility Model Application Laying Open Gazette No. 63-40228 is mounted between the front plate member 6 and the rear plate member 31 in the flexible member 3. This folding mechanism makes the flexible member 3 foldable.

The front portion 4a of the frame member 4 is provided on a front header 51 with a closed cross section. The front header 51 comprises an upper panel 51a and a lower panel 51b. The front portion 4a of the frame member 4 extends rearwardly from the front header 51. The part where the front portion 4a extends from the front header 51 is covered with the front portion of the flexible member 3 (the front plate member 6). Likewise, the rear portion 4b of the frame member 4 is provided on a rear header 52 with a closed cross section. The rear header 52 comprises an upper panel 52a and a lower panel 52b. Reference numerals 53, 54 designate respectively a rear window glass and a front window glass.

Side portionas 4c, 4c of the frame member 4 are mounted on an outer portion 56a of a roof rail 56 with a closed cross section by means of an extension member 57. The roof rail 56 comprises this outer portion 56a and an inner portion 56b.

Control for opening and closing the front portion of the flexible member 3 is carried out with a control system as follows. For example, when opening the front portion of the flexible member 3, a front control switch (not shown in the drawings) is turned to an open portion. Then, the first drive motor 13 is activated and tilts up the front portion of the flexible member 3. In detail, the activation of the first drive motor 13 operates the drive wires 12, 12. As a result, the slider 10 slightly withdraws backware, causing the transition of the engaging pin member 15 from the horizontal groove portion 9b to the inclined groove portion 9c of the cam groove 9a of the cam member 9. Since the position of the engaging pin member 15 is restricted in the vertical direction, the front part of the mounting bracket 7 moves upward. In other words, the rear shoe member 22 of the mounting bracket 7 is positioned in the guide groove 5a of the guide rail 5 while the front shoe member 23 is positioned on the upper surface of the guide rail 5. Accordingly, since the mounting bracket 7 is attached on the front plate member 6 by means of the mounting portions 6a, 6b, the front plate member 6 tilts up, thereby creating a clearance between the rear portion of the flexible member 3 and the vehicle roof panel 2.

When further setting the front control swithch in the open position after the tilting-up motion, the first drive motor 13 is further activated and the front plate member 6 together with the slider 10 withdraws while folding the front portion of the flexible member 3, thereby opening the front of the roof panel opening 2a.

When the flexible member 3 opens completely, the first drive motor 13 enters into, into a locking state. When closing the flexible member 3, the front control switch is turned to a closed portion. Then, the front portion of the flexible member 3 moves forward due to the activation of the first drive motor 13. Then, when the flexible member 3 reaches the front end position and the front control switch is again turned into the closed position, the tilt-up state is released with the activation of the first drive motor 13. Consequently, the first drive motor 13 enters into the locking state, indicating the end of the opening and closing motion of the front portion of the flexible member 3.

The opening and closing of the rear portion of the flexible member 3 is controlled by a rear control switch (not shown in the drawings) in the same manner as the front portion thereof.

When activating the second drive motor 19, the rear plate member 31 at the rear of the flexible member 3 moves forward along with the forward movement of the slider 33, 33. Therefore, the rear portion of the flexible member 3 is tilted up and folded to open the rear of the roof panel opeing 2a in the same manner as the front portion of the flexible member 3. Thus, passenger in the rear seat can enjoy, an upward view and a comfortable ride.

With the activation of the first drive motor 13 or the second drive motor 19, the drive wires 12, 12 or 18, 18 independently operate to moves the sliders 10, 10 or the sliders 33, 33. Consequently, the front and the rear portion of the flexible member 3 can moved independently of each other.

As explained in the preceding description, when the front of the roof panel opening 2a is in the open state, the opening of the rear of the roof panel opening 2a will lead to circulation of air in the longitudinal direction of the vehicle body and will prevent stagnation of the air in the vehicle cabin due to improved ventialtion. Furthermore, the occurrence of a resonance or throbbing sound inside the vehicle cabin can be prevented.

In the above embodiment, the drive motor 13, 19 are spaced apart at a fixed interval in the lateral direction at the lowe side of the center of the rear portion 4b of the frame member 4. However, as shown in FIGS. 6 through 9, the drive motors 61, 62 can be mounted in such a manner that portions thereof are superposed in the upper and the lower positions (i.e. in the vertical direction). In detail, both drive motors 61, 62 are disposed almost at the lateral center of the upper surface of the rear portion 4b of the frame member 4. Reduction gear parts 61a, 62a of the drive motors 61, 62 are arranged in such a manner that portions thereof which are relatively small in height are superposed in the upper and the lower directions at the same lateral position. Thus, a relatively smaller space (especially the space in the later direction) is needed for arranging the drive motors 61, 62. Gears 63, 64 with which the drive wires 12, 12, 18, 18 engage are positioned respectively on the underside of the reduction gear part 61a disposed in the downward direction and on the upper side of the reduction gear part 62a disposed in the upward direction. The drive motors 61, 62 are mounted on the frame member 4 by means of brackets 65, 65 in such a way the drive motors 61, 62 are raised slightly above the frame member 4 out of direct contact therewith (refer to FIG. 8). In addition, portions of the reduction gears 61a, 62a of the first and the second drive motors 61, 62 can be superposed not only in upper and lower positions but also in right and left, and/or front rear positions.

Figure 10:
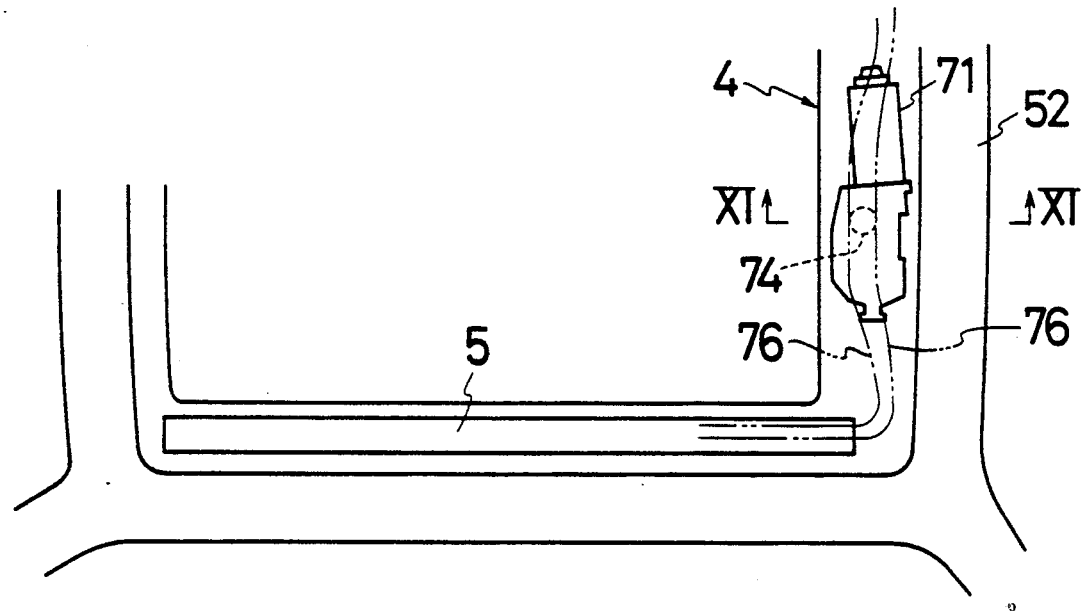
Figure 11:
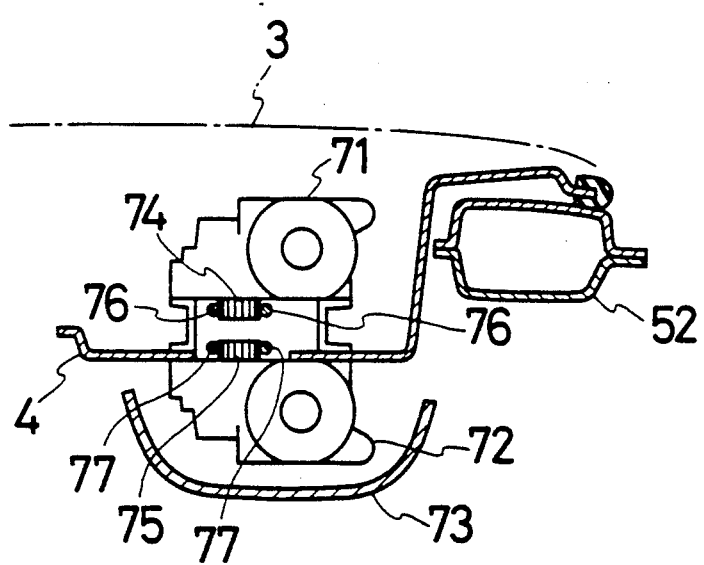

Further, not only can small portions of the reduction gear parts be superposed, but the entirely of the reduction gear parts can be superposed. Further alternative is, as shown in FIGS. 10 and 11, to disposed drive motors 71, 72 facing in upward and downward directions at the rear portion of the frame member 4 so that the whole of the drive motors 71, 72 can be superposed in the vertical direction. In this case, the drive motor 72 facing downwardly is covered with a trim 73. Reference numerals 74, 75 designate gears engaging with drive wires 76, 76, 77, 77 which are operatively interconnected with the front and the rear portions of the flexible member 3. The gear 74 and 75 are attached respectively on the underside of the drive motor 71 (a reduction gear part) which faces upwardly and on the upper side of the drive motor 72 (a reduction gear part) which faces downwardly. The gear 75 passes through the frame member 4 to be exposed on the surface of the frame member 4.

As many apparently widely different embodiments of this invention may be made without departing from the spirit and scope thereof, it is to be understood that the present embodiment is therefore illustrative and not restrictive. The scope of the invention is defined by the appended claims rather than by the description preceding them, and all changes that fall within the meets and bounds of the claims, or equivalents of such meets and bounds are therefore intended to be embraced by the claims.

What is claimed is:

1. A slidable roof device for a motor vehicle having a vehicle roof panel defining an upper portion of a vehicle body, a roof panel opening formed in said vehicle roof panel and enclosed by a front header, right and left roof rails, and a rear header, a flexible member being provided on said vehicle roof panel and being foldable in the longitudinal direction of the vehicle body, said flexible member being selectively movable between a folded state for opening said roof panel opening and an extended state for closing said roof panel opening, said slidable roof device comprising:

first drive means operatively interconnected with a front portion of said flexible member for moving said front portion thereof toward a rear end of the vehicle body; and second drive means operatively interconnected with a rear portion of said flexible member for moving said rear portion thereof toward a front end of the vehicle body;

wherein said first and second drive means are mounted at a rear end of said roof panel opening of said vehicle roof panel; and wherein said first and second drive means comprise a first and a second drive motor, respectively, which are operatively interconnected with said front and rear portions, respectively, of said flexible member by drive wires, and portions of said first and second drive motors are superposed.

2. A slidable roof device for a motor vehicle as defined in claim 1, further comprising a frame member forming said roof panel opening, said frame member being provided in such a manner that a front portion thereof is attached to the front header, a rear portion thereof is attached to the rear header, and sides thereof are attached to the right and left roof rails, respectively, said first and second drive means being provided substantially at the lateral center of the rear portion of said frame member.

3. A slidable roof device for a motor vehicle as defined in claim 1, wherein said first and second drive motors are respectively provided with reduction gear parts, and superposed portions of said reduction gear parts of said first and second drive motors are superposed along the vertical direction.

4. A slidable roof device for a motor vehicle having a vehicle roof panel defining an upper portion of a vehicle body, a roof panel opening formed in said vehicle roof panel and enclosed by a front header, right and left roof rails, and a rear header, a flexible member being provided on said vehicle roof panel and being foldable in the longitudinal direction of the vehicle body, said flexible member being selectively movable between a folded state for opening said roof panel opening and an extended state for closing said roof panel opening, said slidable roof device comprising:

first drive means operatively interconnected with a front portion of said flexible member for moving said front portion thereof toward a rear end of the vehicle body; and second drive means operatively interconnected with a rear portion of said flexible member for moving said rear portion thereof toward a front end of the vehicle body;

wherein a frame member is provided and forms said roof panel opening, said frame member being provided in such a manner that a front portion thereof is attached to the front header, a rear portion thereof is attached to the rear header, and sides thereof are attached to the right and left roof rails, respectively, said first and second drive means being provided substantially at the lateral center of the rear portion of said frame member; and wherein said first and second drive means are mounted at said rear portion of said frame member such that said first and second drive means are substantially wholly superposed relative to one another along the vertical direction.

5. A slidable roof device for a motor vehicle as defined in claim 4, further comprising:

first tilt means for tilting said front portion of said flexible member upwardly as said front portion of said flexible member is moved rearwardly by said first drive means; and second tilt means for tilting said rear portion of said flexible member upwardly as said rear portion of said flexible member is moved forwardly by said second drive means.

6. A slidable roof device for a motor vehicle having a vehicle roof panel defining an upper portion of a vehicle body, a roof panel opening formed in said vehicle roof panel and enclosed by a front header, right and left roof rails, and a rear header, a flexible member being provided on said vehicle roof panel and being foldable in the longitudinal direction of the vehicle body, said flexible member being selectively movable between a folded state for opening said roof panel opening and an extended state for closing said roof panel opening, said slidable roof device comprising:

first drive means operatively interconnected with a front portion of said flexible member for moving said front portion thereof toward a rear end of the vehicle body;

second drive means operatively interconnected with a rear portion of said flexible member for moving said rear portion thereof toward a front end of the vehicle body; and wherein said first and second drive means comprise a first and a second drive motor, respectively, which are operatively interconnected with said front and rear portions, respectively, of said flexible member by drive wires, and portions of said first and second drive motors are superposed.

7. A slidable roof device for a motor vehicle as defined in claim 6, wherein said first and second drive motors are respectively provided with reduction gear parts, and superposed portions of said reduction gear parts of said first and second drive motors are superposed along the vertical direction.

8. A slidable roof device for a motor vehicle as defined in claim 6, wherein said superposed portions of said first and second drive motors are superposed along the vertical direction.

9. A slidable roof device for a motor vehicle as defined in claim 6, wherein said superposed portions of said first and second drive motors comprise substantially the whole of said first and second drive motors, respectively.

10. A slidable roof device for a motor vehicle as defined in claim 6, further comprising:

first tilt means for tilting said front portion of said flexible member upwardly as said front portion of said flexible member is moved rearwardly by said first drive means; and second tilt means for tilting said rear portion of said flexible member upwardly as said rear portion of said flexible member is moved forwardly by said second drive means.

11. A slidable roof device for a motor vehicle as defined in claim 6, wherein said first and second drive means are mounted near said roof panel opening of said vehicle roof panel.

12. A slidable roof device for a motor vehicle as defined in claim 6, wherein
said first motor comprises an electric motor.

13. A slidable roof device for a motor vehicle as defined in claim 12, wherein
said first motor is fixed to the vehicle roof panel.

14. A slidable roof device for a motor vehicle as defined in claim 6, wherein
said second motor comprises an electric motor.

15. A slidable roof device for a motor vehicle as defined in claim 14, wherein
said second motor is fixed to the vehicle roof panel.

* * * * *